US012056997B1

(12) United States Patent
Dresser et al.

(10) Patent No.: US 12,056,997 B1
(45) Date of Patent: Aug. 6, 2024

(54) SOUNDER DEVICE FOR USE WITH A DETECTOR

(71) Applicant: Power Design, Inc., Saint Petersburg, FL (US)

(72) Inventors: Mark Samuel Dresser, Saint Petersburg, FL (US); Joel Wallter Snook, Grass Valley, CA (US)

(73) Assignee: Power Design, Inc., Saint Petersburg, FL (US)

( * ) Notice: Subject to any disclaimer, the term of this patent is extended or adjusted under 35 U.S.C. 154(b) by 0 days.

(21) Appl. No.: 18/381,918

(22) Filed: Oct. 19, 2023

(51) Int. Cl.
*G08B 17/10* (2006.01)
*H04R 1/02* (2006.01)

(52) U.S. Cl.
CPC ............. *G08B 17/10* (2013.01); *H04R 1/025* (2013.01); *H04R 1/028* (2013.01); *H04R 2201/021* (2013.01)

(58) Field of Classification Search
CPC .. G01P 15/09; G08B 3/10; G08B 7/06; G08B 7/062; G08B 13/08; G08B 13/14; G08B 13/1436; G08B 13/22; G08B 17/00; G08B 17/06; G08B 17/10; G08B 17/103; G08B 21/088; G08B 21/16; G08B 25/012; G08B 29/06; H01Q 1/007; H04R 1/025; H04R 1/028; H04R 2201/021
USPC .......................................................... 340/628
See application file for complete search history.

(56) References Cited

U.S. PATENT DOCUMENTS

| | | | | | |
|---|---|---|---|---|---|
| 4,176,346 | A * | 11/1979 | Johnson | G08B 17/00 340/628 |
| 5,291,183 | A | 3/1994 | Chiang | |
| 8,125,320 | B2 | 2/2012 | Yamano | |
| 9,390,605 | B2 | 7/2016 | Schmid | |
| 2006/0220891 | A1* | 10/2006 | Barrett | G08B 29/24 429/1 |
| 2007/0285262 | A1* | 12/2007 | Lax | G08B 17/113 340/628 |

(Continued)

FOREIGN PATENT DOCUMENTS

| | | |
|---|---|---|
| CN | 103318080 | 9/2013 |
| DE | 102014201102 | 7/2015 |

OTHER PUBLICATIONS

Life Safety Consultants, Simplex (4098-9794) Analog Sensor Sounder Base—0677337CN, https://www.lifesafetycom.com/product/simplex-sensor/, downloaded on Oct. 19, 2023.

(Continued)

*Primary Examiner* — Stephen R Burgdorf
(74) *Attorney, Agent, or Firm* — The Concept Law Group, PA; Scott D. Smiley; Scott M. Garrett

(57) ABSTRACT

A sounder device is mountable on a wall or ceiling and is connected to a power source. The sounder also includes a mounting interface that is configured to receive a detector. The mounting interface portion is a low-profile section, and the sounder device includes a housing portion to the side of the mounting interface in which most of the electronics and other components are housed. When the detector is triggered to alarm, which results in a tone at 3250 Hz being emitted, the alarm state is detected by the sounder device and the sounder device emits a tone at 520 Hz to ensure people who may not be able to hear the tone at 3250 Hz hear an alarm tone.

13 Claims, 11 Drawing Sheets

(56) References Cited

U.S. PATENT DOCUMENTS

| | | | | |
|---|---|---|---|---|
| 2008/0303677 | A1* | 12/2008 | Hart | G08B 17/10 340/600 |
| 2009/0085727 | A1* | 4/2009 | Yamano | G08B 3/10 340/384.4 |
| 2011/0095900 | A1* | 4/2011 | Smith | G08B 3/10 340/693.9 |
| 2011/0193713 | A1* | 8/2011 | Albert | G08B 3/10 340/635 |
| 2013/0146390 | A1 | 6/2013 | Runciman et al. | |
| 2015/0145684 | A1* | 5/2015 | Schmid | G08B 17/107 340/628 |
| 2015/0181741 | A1* | 6/2015 | Stagg | G08B 25/08 361/731 |
| 2017/0228993 | A1 | 8/2017 | Avak et al. | |

OTHER PUBLICATIONS firealarm.com, Kidde KI-ABLT, https://firealarm.com/product/kidde-ki-abit/,downloaded on Oct. 19, 2023.

Notifier By Honeywell, Sounder Bases, https://www.securityandfire.honeywell.com/notifier/en-us/browseallcategories/fire-alarm-peripheral-devices/intelligent-devices/sounder-bases, downloaded on Oct. 19, 2023.

* cited by examiner

200

SOUNDER DEVICE FOR USE WITH A DETECTOR

FIELD OF THE INVENTION

The present invention relates generally to the use of sounders in a fire alarm system and with smoke detectors, and, more particularly, relates to the arrangement of fire alarm, sounder, and smoke detector components in residence units in a way that reduces the number of connections to the building alarm panel.

BACKGROUND OF THE INVENTION

Fire alarm and smoke detector systems are used in a wide variety of applications, from single home residences to large multi-unit residential buildings to warehouse and industrial buildings. There are also several types of fire alarm and smoke detector systems, and each type may be better suited for certain applications than the other types of such systems. In general, a fire alarm system includes a centralized device called an alarm panel. Various smoke, heat, and other sensors are connected to the alarm panel, as are sounding devices (e.g. speakers, buzzers, bells), "pull to alarm" switches, relays, and other components. One purpose of a fire alarm panel is that it can identify approximately where in a building the fire may be located. Depending on the system configuration, and coarseness of the location areas can vary greatly. For example, in a multi-residence building, there can be several fire/smoke detectors in each residence. Each of these can be wired to the alarm panel. In addition, there can be several sounding devices to create an additional audible alarm to that of the fire/smoke detector at a different audio frequency to ensure the alarm can be heard. Each of these devices, and their wiring represent costs to deploying the alarm system, not just in material costs but in labor costs to run all the various electrical lines for each device. In addition, the panel has to be programmed to indicate where each device/sensor is located. In a large multi-residence building, multiple panels will be often be required.

Therefore, a need exists to overcome the problems with the prior art as discussed above.

SUMMARY OF THE INVENTION

In accordance with some embodiments of the inventive disclosure, there is provided a sounder device for use with a detector that includes a mounting face at a back of the sounder device that is configured to be against a wall when the sounder device is mounted on the wall. The sounder device also includes a mounting portion that is configured to receive a detector, and the mounting portion includes an electrical connector that has power terminals and alarm terminals. There is also included a housing portion located at a side of the mounting portion and which includes a rechargeable battery, a speaker, a charge control circuit coupled to the power terminals and operable to charge the rechargeable battery, an amplifier coupled to the speaker and configured to drive the speaker, and a control circuit coupled to the alarm terminals and to the amplifier. The control circuit is configured to detect an alarm state at the alarm terminals and in response cause the amplifier to drive the speaker at frequency below 3250 Hz.

In accordance with another feature, the mounting portion has a mounting surface, the housing portion extends outward relative the mounting surface a first distance in a direction perpendicular to the mounting surface, where no portion of the housing portion extends further than the first distance, and the first distance is selected to be less that a distance from the mounting surface to a skirt of a detector mounted on the mounting surface when the detector is mounted on the mounting surface.

In accordance with another feature, the electrical connector includes a positive power terminal, and negative power terminal, a positive alarm terminal, and a negative alarm terminal.

In accordance with another feature, the control circuit is configured to cause the amplifier to drive the speaker at 520 Hz.

In accordance with another feature, the amplifier is powered exclusively by the rechargeable battery.

In accordance with some embodiments of the inventive disclosure, there is provided a fire detection and alarm system which includes a sounder device and a detector. The sounder device has a mounting face that is configured to be mounted against a wall, and a mounting portion having a mounting surface opposite the mounting face. There is electrical connector disposed at the mounting surface having power terminals and alarm terminals. The sounder device also includes a housing portion adjacent the mounting portion including a rechargeable battery and a speaker. There is also an amplifier coupled to, and configured to drive the speaker, and a control circuit coupled to the alarm terminals that is configured to detect an alarm state at the alarm terminals and, in response, cause the amplifier to drive the speaker at an alarm tone that is less than 3250 Hz. The detector is mounted on the mounting portion and has power terminals coupled to the power terminals of the electrical connector disposed at the mounting surface. The detector also has alarm terminals connected to the alarm terminals of the electrical connector disposed at the mounting surface. The detector is configured to detect an ambient condition indicative of a fire and in response assert an alarm state at the alarm terminals.

In accordance with another feature, the housing portion extends outward relative the mounting surface a first distance in a direction perpendicular to the mounting surface, where no portion of the housing portion extends further than the first distance, and the first distance is selected to be less that a distance from the mounting surface to a skirt of the detector.

In accordance with another feature, the electrical connector includes a positive power terminal, and negative power terminal, a positive alarm terminal, and a negative alarm terminal.

In accordance with another feature, the control circuit is configured to cause the amplifier to drive the speaker at 520 Hz.

In accordance with another feature, the amplifier is powered exclusively by the rechargeable battery.

In accordance with some embodiments of the inventive disclosure, there is provided a system for fire detection and alarming for a building having a plurality of residence units that includes, in each residence unit of the plurality of residence units, a plurality of sounder and detector paired units. Each sounder and detector paired unit includes a sounder unit mounted on a wall and having an electrical connector including an alarm line. The sounder unit has a mounting portion that has a mounting surface, and has an electrical connector disposed at the mounting surface that has power terminals and alarm terminals. The alarm terminals are connected to the alarm line. There is also included a detector that is mounted at the mounting surface and is electrically connected to the electrical connector. The detector is configured to detect at least one of fire or smoke and generate an alarm signal on the alarm terminals and an audible alarm at a first frequency. The sounder unit is configured to detect the alarm signal and in response generate an audible alarm at a second frequency. The alarm line is connected to an alarm panel of the building and to each other sounder and detector paired unit in the residence unit.

In accordance with another feature, the first frequency is 3250 Hz and the second frequency is 520 Hz.

In accordance with another feature, the sounder unit includes a rechargeable battery that is charged via the electrical connector, and which is used by an audio amplifier of the sounder unit to generate the audible alarm at the second frequency.

In accordance with another feature, the rechargeable battery and the audio amplifier are housed in a lobed housing that extends to a side of the mounting portion.

In accordance with another feature, the alarm line of each residence unit of the plurality of residence units is the only alarm line connected between the residence unit and the alarm panel for each residence unit of the plurality of residence units.

Although the invention is illustrated and described herein as embodied in a sounder device, a sounder device and detector system, and a fire detection system for residence units, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
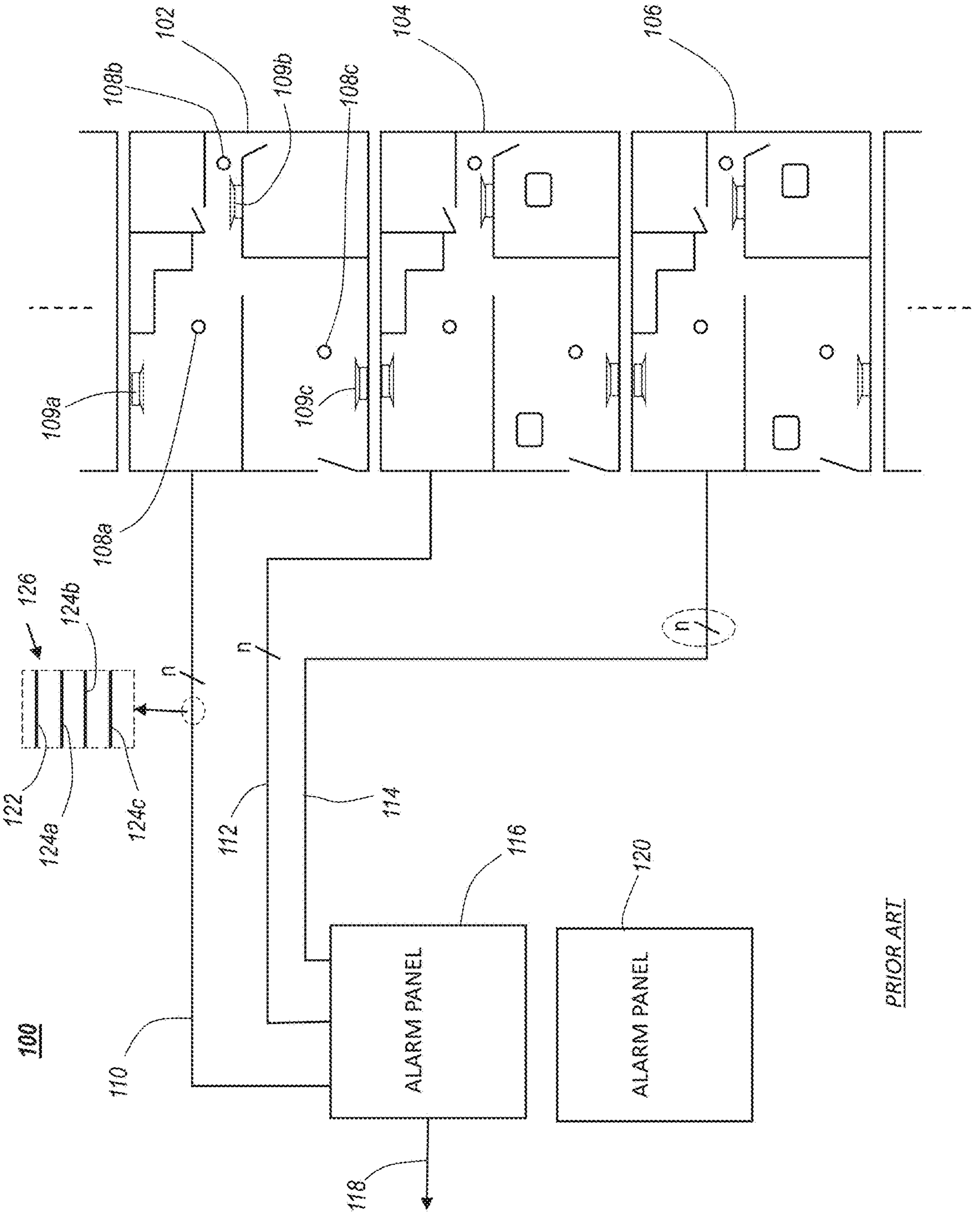
FIG. 1 shows a prior art fire alarm system for a multi-residence building.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 shows a prior art fire alarm system 100 for a multi-residence building. The building includes multiple residential units 102, 104, 106 (among other). In each residential unit there are a plurality of detectors 108*a*-108*c*, and a plurality of speakers 109*a*-109*b* used as sounders. More or less of both the detectors 108 and sounder speakers 109 can be present, depending on the particular application and they are typically separate in the residence unit. The detectors 108 detect evidence of fire, such as smoke and/or heat or any other ambient condition indicative of fire occurring. Each detector typically has a piezo audio transducer that emits an acoustic signal at 3250 Hz. When the detector circuitry of a detector 108 is triggered by smoke/heat it both causes the piezo transducer to emit the 3250 Hz acoustic signal, and collectively the detectors can change the state of an alarm line that is provided to an alarm panel. For example, the detectors 108 of residence unit 102 are connected by wires 110 to an alarm panel 116. Similarly, the detectors of residence unit 104 are connected to the alarm panel 116 by wires 112, and the detectors of residence unit 106 are connected to the alarm panel by wires 114. Each of the wire groups 110, 112, 114 contain "n" wires. Among the wires in each group, as shown in the detail 126, is an alarm wire (or wire pair) 122, and then three pairs of wires 124*a*, 124*b*, 124*c* that are connected to circuitry in the alarm panels 116 used to drive speakers 109*a*, 109*b*, and 109*c*, respectively. That is, wires 124*a* are used to drive speaker 109*a*, wires 124*b* are used to drive speaker 109*b*, and wires 124*c* are used to drive speaker 109*c*. In some prior art systems, the alarm wire(s) 122 are connected to the output of a relay that is connected to one of the detectors 108*a*-108*c*, and a separate alarm line connects the detectors 108*a*-108*c* inside the residence unit in a "daisy chain" arrangement so that if one detector is triggered, they will all alarm and emit the 3250 Hz alarm sound. The change in state between the alarm wires interconnecting the detectors is detected by the other detectors on the circuit, which can trigger the relay so that the alarm panel 116 can respond. When the alarm panel 116 detects an alarm signal for a given residence unit, it can transmit an alarm notification via line 118 to fire authorities in the area so that firefighters will respond. The alarm panel 116 will indicate which residence unit experienced the alarm condition.

In addition, because some people, particularly elderly people, have a hard time hearing acoustic signals at 3250 Hz, the alarm panel activates the sounder speaker 109*a*, 109*b*, and 109*c* in the particular residence using wire pairs 124*a*, 124*b*, and 124*c*. The sounder speakers 109*a*-109*c* are driven by the signal on wire pairs 124*a*-124*c* to emit an acoustic signal having a frequency below 3250 Hz. For example, a signal at 520 Hz is generated when alarm panel 116 is triggered/activated. The sounder speakers 109*a*-109*c* require their own wiring (124*a*-124*c*) from the alarm panel 116. In addition, the alarm panel is typically provisioned to set off the alarms in any residence unit above and below the residence unit experiencing the smoke/fire or other detected ambient condition.

Accordingly, there numerous wires in each wire group 110, 112, 114. This arrangement also requires multiple sections on the alarm panel 116 for each residence; one for the detectors 108 and one for each of the sounder speakers 109*a*-109*c*. In addition, the alarm panel 116 requires provisioning/programming for each set of wires. As a result, a large building will typically require one or more additional alarm panels 120. The use of sounder/detector pairs as disclosed herein eliminates the need for wires to drive sounder speakers, as well as the amplifier cards to drive each of the sounder speaker from the alarm panel, and it therefore eliminates the need to provision the amplifier cards for each of the sounder speakers. In a building that can have tens, dozens or even hundreds of residence units, the reduction of wiring, provisioning, and maintenance afforded by the inventive disclosure is substantial.

Figure 2:
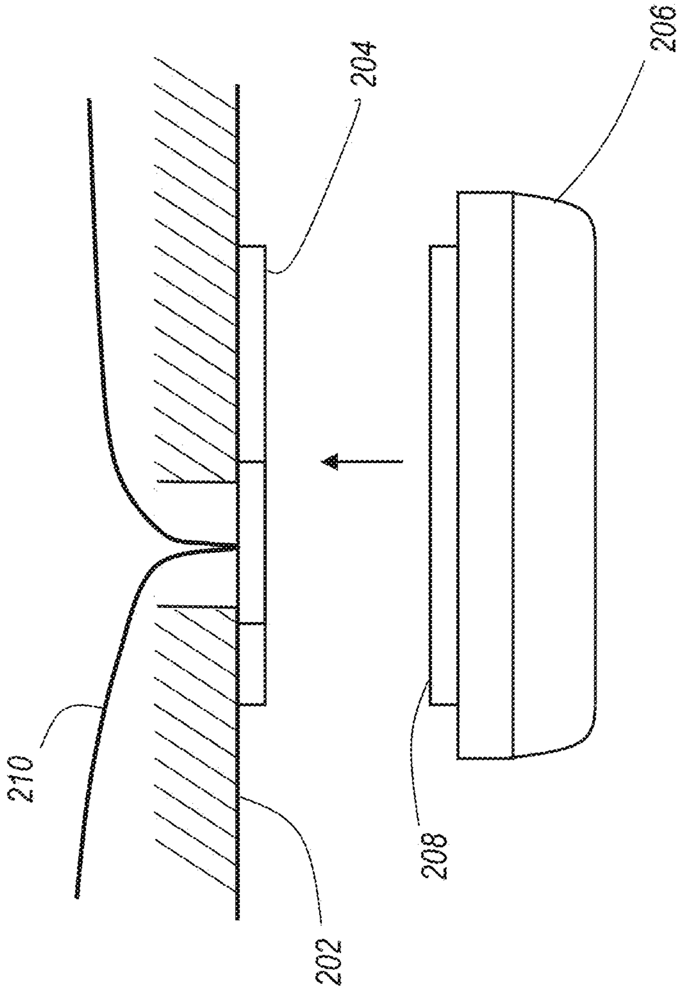
FIG. 2 PRIOR ART
FIG. 2 shows a prior art smoke detector mount on a ceiling of a living area.

FIG. 2 shows a prior art smoke detector mount 200 on a ceiling 202 of a living area. This is a conventional detector arrangement where there is a mounting base 204 mounted on the ceiling 202. Wiring 210 is passed above the ceiling to the mounting base 204 through an opening in the ceiling 202 (e.g., at a junction box) to connect to an electrical connector in the mounting base 204 that interfaces with a corresponding connector in the base 208 of the detector 206. Because the same wiring can be connected to multiple detectors in a so-called "daisy chain" arrangement, the wiring 210 can extend on to other detector locations and connect to the other detectors in the residence/residence unit. The detector 206 can removably couple to the base through interlocking mechanical features provided on the mounting base 204 and the base 208 of the detector 206. The wiring 210 includes both power and alarm lines. The detector 206 is configured to detect smoke, but can alternatively be a fire detector, a carbon monoxide detector, and so on. When the detector 206 is triggered by sensing smoke (or heat, or flame, or some other ambient condition) it changes the electrical state of the alarm line, which is detected by the alarm panel (assuming the local residence system is connected to an alarm panel), as well as other detectors on the same wiring 210, and then all of the detectors in the residence will emit an acoustic alarm signal at 3250 Hz. Any sounder speakers in the same residence will then be activated by the alarm panel.

Figure 3:
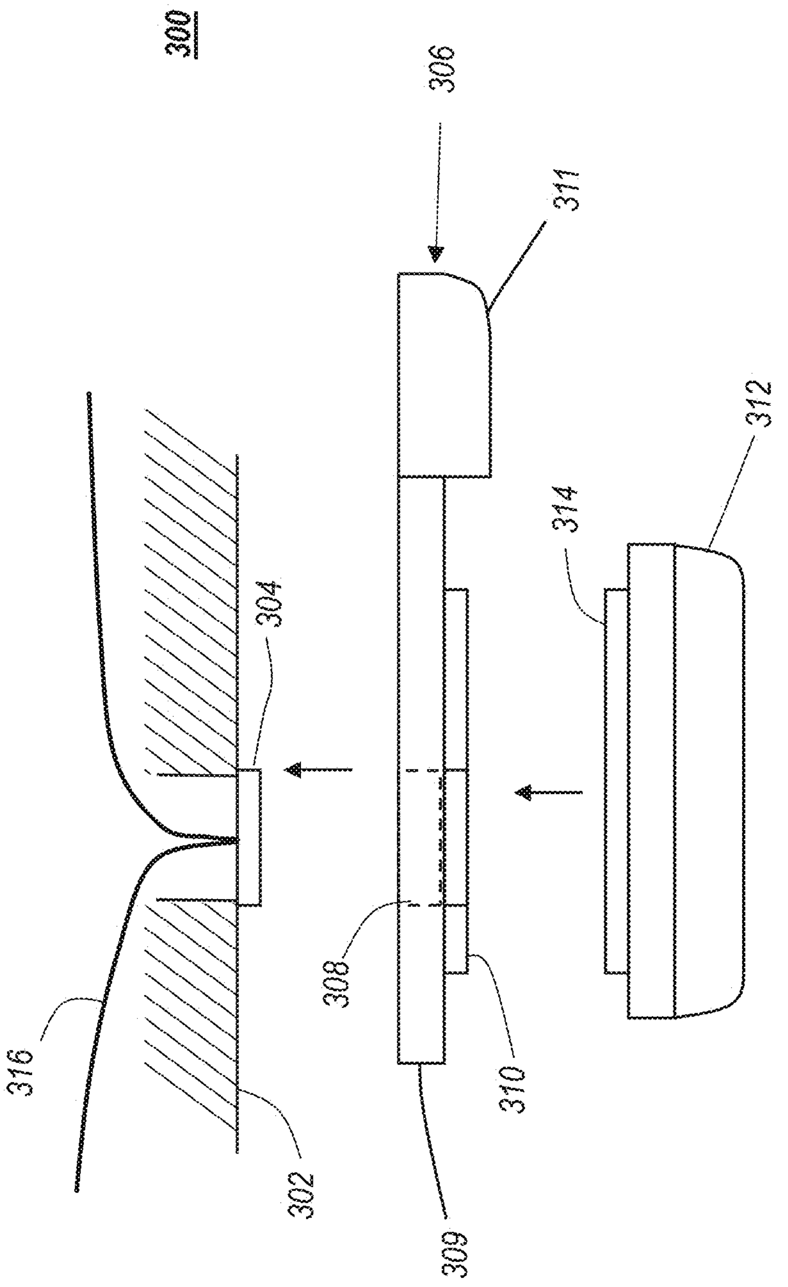
FIG. 3 shows a sounder and detector unit pair, in an elevational exploded view, in accordance with some embodiments.

FIG. 3 shows a sounder and detector unit pair 300, in a side elevational exploded view, in accordance with some embodiments. In particular there is a sounder or sounder device 306 and a detector 312 shown here that operate together. The detector 312 can be a conventional prior art detector such as detector 206 of FIG. 2. The sounder 306 has a connector 308 in a mounting section 309 that interfaces with mating connector 304 that is provided through a wall or ceiling 302 and is connected to the wiring 316. The mounting portion 309 of the sounder 306 is configured to receive the detector mounting base 310 on the opposite side of the mounting portion 309 from the side facing the ceiling/wall. In the mounting portion 309 the pass-through electrical connector 308 allows the detector 312 to connect to the wiring 316. Thus, even though the detector 312 is mounted on the sounder 306, electrically it is no different than if the detector 312 were directly mounted on the ceiling/wall 302. Several sounder/detector pairs as shown here can be provided in a given residence, and each one of the detectors is connected to the detectors by a wire or wires in wiring 316. This allows the detector to all alarm when one detects smoke (or fire, or other ambient condition).

The sounder 306 has a housing portion 311 to the side of the mounting portion 309 and can have a common plane along the back of the sounder 306 so that the sounder 306 can fit substantially flush against the ceiling/wall 302. The housing portion 311 is generally narrower (in a direction parallel to the plane of the back) than the diameter of the mounting portion 309, and thus forms a lobe that extends outward from the mounting portion 309. In the housing portion 311 there is contained some circuitry and electrical components for operating the sounder 306, but there can also be circuitry in the mounting portion 309. In particular, there is a magnetic coil speaker that is used to produce a 520 Hz acoustic signal in the housing portion 311. The speaker is driven by a high efficiency audio amplifier, such as a full bridge amplifier, and the 520 Hz signal is provided to the amplifier by a controller/control circuit. The housing portion 311 can also contain a rechargeable battery along with the control circuitry. The circuitry in the housing portion 311 is connected to the wiring of the pass-through connector 308, and thus has access to both the power and the alarm lines that are provided to the detector 312. As a result, the sounder 306 can monitor the alarm line, and upon detecting an alarm state or alarm signal at the alarm line asserted by the detector the sounder 306 will commence producing the 520 Hz acoustic signal. In addition, by monitoring the alarm line, when the alarm line is reset (e.g., the detector no longer detects the triggering condition), both the detector 312 and the sounder 306 will cease making alarm sounds until being activated again.

Figure 4:
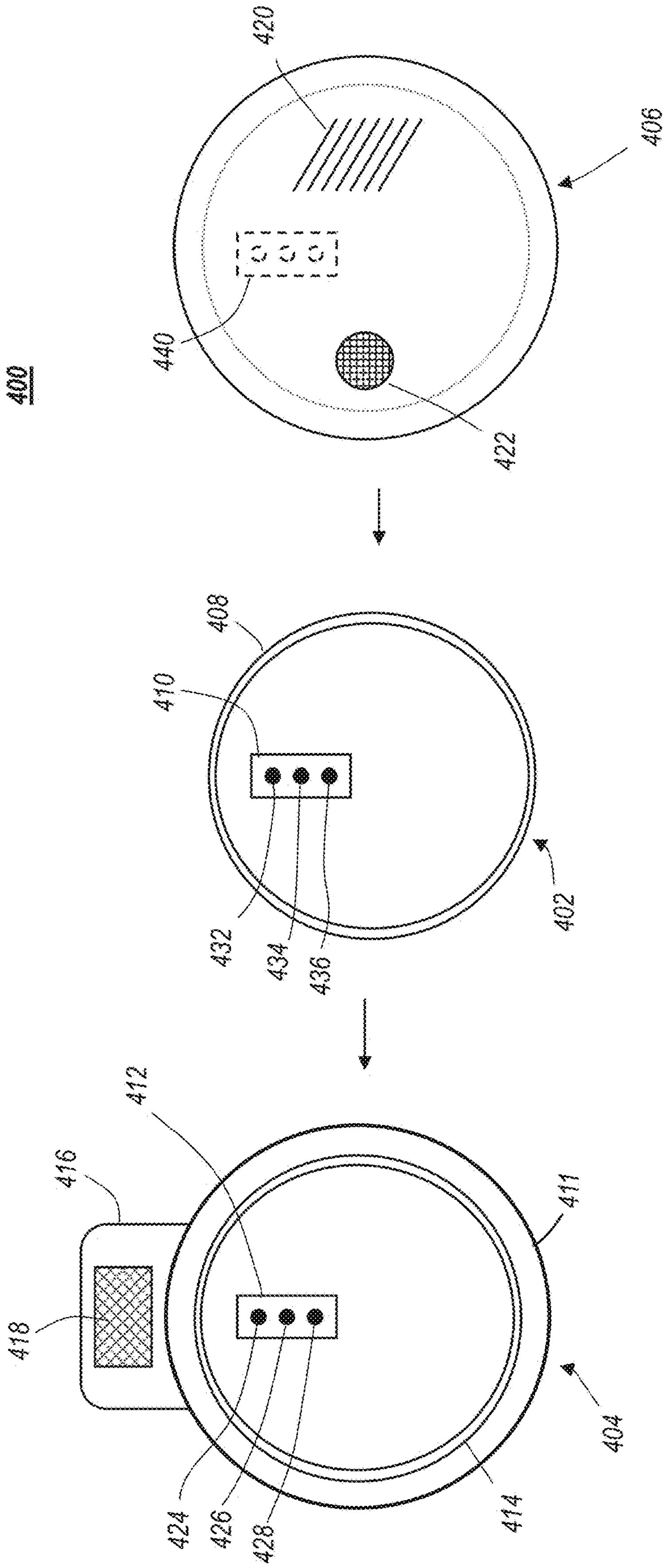
FIG. 4 shows a sounder and detector unit pair, in a plan exploded view, in accordance with some embodiments.

FIG. 4 shows a sounder and detector unit pair 400, in an exploded plan view, in accordance with some embodiments. The pair 400 includes a sounder 404 and next to the sounder 404 is a mounting base 402 for a detector 406 that is shown next to the mounting base 402. The mounting base 402 can be substantially the same as mounting base 304, and is mounted on the sounder 404 at a mounting portion 411. Alternatively, in some embodiments, the mounting portion 411 can be configured to mimic the base 402 so that the detector 406 can be mounted directly to the sounder 404 at the mounting portion 411 of the sounder 404. Accordingly, the detector 406 is operatively mounted on the sounder 404, either directly on the sounder 404, or on a base 402 that is mounted on the sounder 404.

The sounder 404 can be substantially the same as sounder 306, and the detector 406 can be substantially the same as detector 312. The mounting base 402 can include a rim 408 that includes mounting features that have, for example, a "turn lock" operation that interface with corresponding features on the bottom of the detector 406. Thus, when the detector 406 is inserted into the mounting base 402, the detector 406 can be turned relative to the mounting base 402 to cause mechanical features to deflect and then lock in place, as is known. Other known mounting arrangements can be used equivalently. The mounting base 402 also includes an electrical connector 410 that connects to the power and alarm wiring that can further connected to other sounder and detector paired units. The mounting base 402 is designed to receive the detector 406 directly. Here, the mounting base 402, which is configured to be mounted directly on the ceiling or wall is instead mounted on the sounder 404. For the purpose of discussion, it will be recognized that a ceiling is a type of wall having a generally horizontal plane and being positioned overhead. The sounder 404 is configured to mount on the ceiling or wall, and receives the mounting base 402 on a mounting base surface 414. There is also a pass-through electrical connector 412 that is electrically connected to the electrical connector 410 of the mounting base 402 when the mounting base 402 is mounted on the sounder 404. In particular, pass-through connector 412 can have terminals 424, 426, and 428 which are configured to connect to terminals 432, 434, and 436 of connector 410, or directly to similar terminals at a connector 440 on the back of the detector 406. In each connector 410, 412, 440, there can be two terminals for power (line and neutral) and one terminal for alarm signaling. Connector 412 of the sounder is connected to the wiring provided through the wall or ceiling, typically at a junction box through an opening in the wall or ceiling that is covered by the sounder 404.

Figure 5:
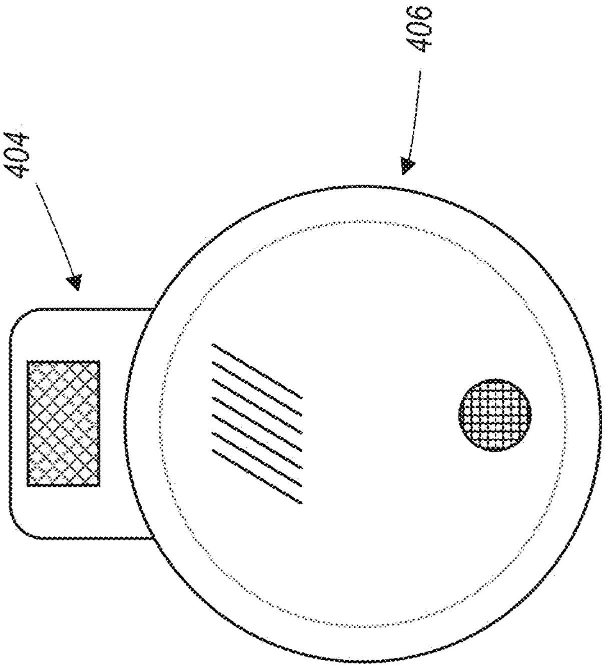
FIG. 5 shows a sounder and detector unit pair, in a plan view, in accordance with some embodiments.

The sounder 404 further includes a housing portion 416 that can be substantially the same as housing portion 311, which houses a speaker 418, among other circuitry and circuit elements. The speaker is a magnetic coil operated speaker, and not, for example, a piezo device, in order to get the desired volume output level to ensure that the 520 Hz alarm tone is heard. The detector 406 simply mounts onto the mounting base 402 as guided by the rim 408, and is connected to the pass-through connector 412, and thereby the electrical connector 410 of the mounting base 402, and through that connector 410 to connector 412 which is connected to power, and can also be connected to alarm lines. The detector 406 can include a vent 420 that allows air to pass through the detector 406, and a sensor inside the detector 406 is used to detect, for example, smoke. When the sensor is triggered, then the detector 406 asserts an alarm signal on the alarm line. FIG. 5 shows the detector 406 mounted on the sounder 404 as would be seen from directly below the sounder and detector pair while looking up at a ceiling mounted pair.

The detector 406 is normally powered by the power line wires, but can operate on battery if power is lost. The detector 406 can operate connected to alarm lines via connectors 410, 412 so that if one detector goes off and asserts an alarm state on the alarm wire, the other detectors will likewise go off (e.g., produce the 3250 Hz alarm tone). In addition, since the detector 404 can sense the alarm wire state, it, and the other sounders connected to the alarm wire, will also begin emitting an alarm sound at a lower frequency than the detectors. In some embodiments the alarm wire can trip an alarm relay that is connected to an alarm panel.

Figure 6:
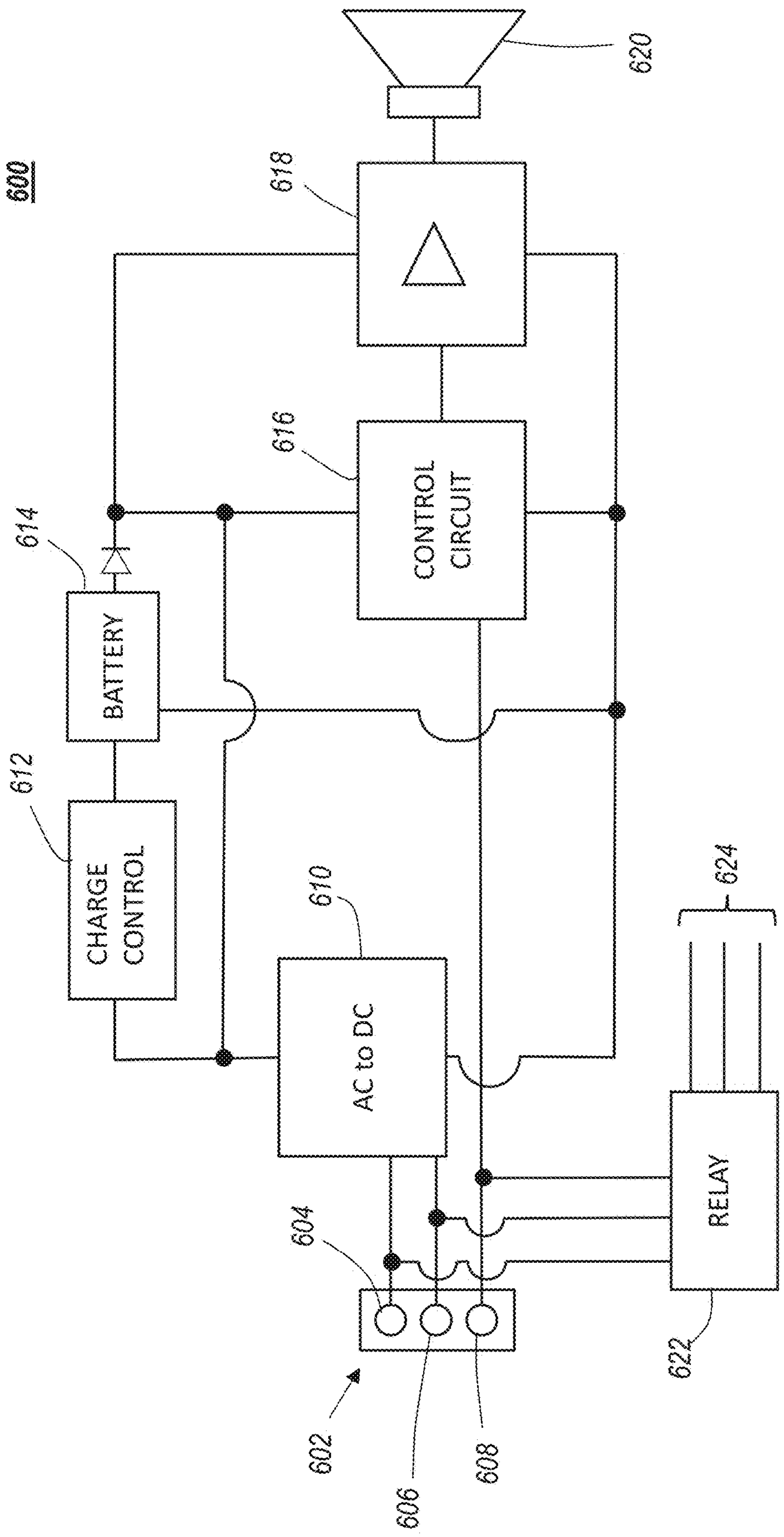
FIG. 6 shows a block circuit schematic diagram of a sounder unit, in accordance with some embodiments.

FIG. 6 shows a block circuit schematic diagram of a sounder unit 600, in accordance with some embodiments. The sounder unit (or simply sounder) 600 includes a pass-through connector 602 that can be substantially similar to pass through connector 412. As shown there, there can be three terminals including a line power terminal 604 that is configured to be connected to a line power of a commercial AC service, a neutral power terminal 606 that is configured to be connected to a negative power line, and an alarm terminal 608 which is configured to be connected to an alarm line. The AC power is converted to DC by an AC to DC converter circuit 610 for use by a charge control circuit 612 to charge a battery 614. The power provided at terminals 604, 606 is an alternating current (AC) power provided by standard residential power service. The battery 614 can be a long-life type lithium based rechargeable battery or battery cell. The charge control circuit 612 keeps the battery 614 charged. A control circuit 616 monitors the alarm terminal 608. When a detector coupled to the alarm line 608 detects evidence of a fire (e.g., smoke, heat, or flame), it asserts a signal on the signal line 608. The control circuit 616 is configured to detect this alarm state of the alarm line 608 whether the alarm state is caused by the detector coupled to the sounder, or it is caused by another detector on the alarm line circuit. Once the alarm state or alarm signal is detected, the control circuit 616 is configured to cause the high efficiency audio power amplifier 618 to drive the speaker 620. Specifically, the control circuit 616 can enable the amplifier 618 and provide, for example, a 520 Hz signal to the power amplifier 618 (either directly or from a reference circuit). The 520 Hz alarm tone is specified in some locations, but other location another frequency that is below 3250 Hz may be used. The power amplifier 618 drives the speaker 620 to create the acoustic audio signal at 520 Hz, or at whatever frequency is selected. The power amplifier 618 can use, for example, a full bridge configuration that is controlled by the control circuit 616. In some embodiments the control circuit 616 can include a microprocessor and memory that holds instruction code that is executed by the processor.

In addition, the sounder device 600 can include a relay 622 that can be connected to the power terminals 604, 606, and the alarm terminal 608. The relay has output lines 624 that can connect to an alarm panel if desired. When connected to an alarm panel, when the alarm signal is asserted at alarm terminal 608, the relay 622 will change the state of the output lines 624 to the alarm panel, which will respond by enabling other alarming devices in the building.

Figure 7:
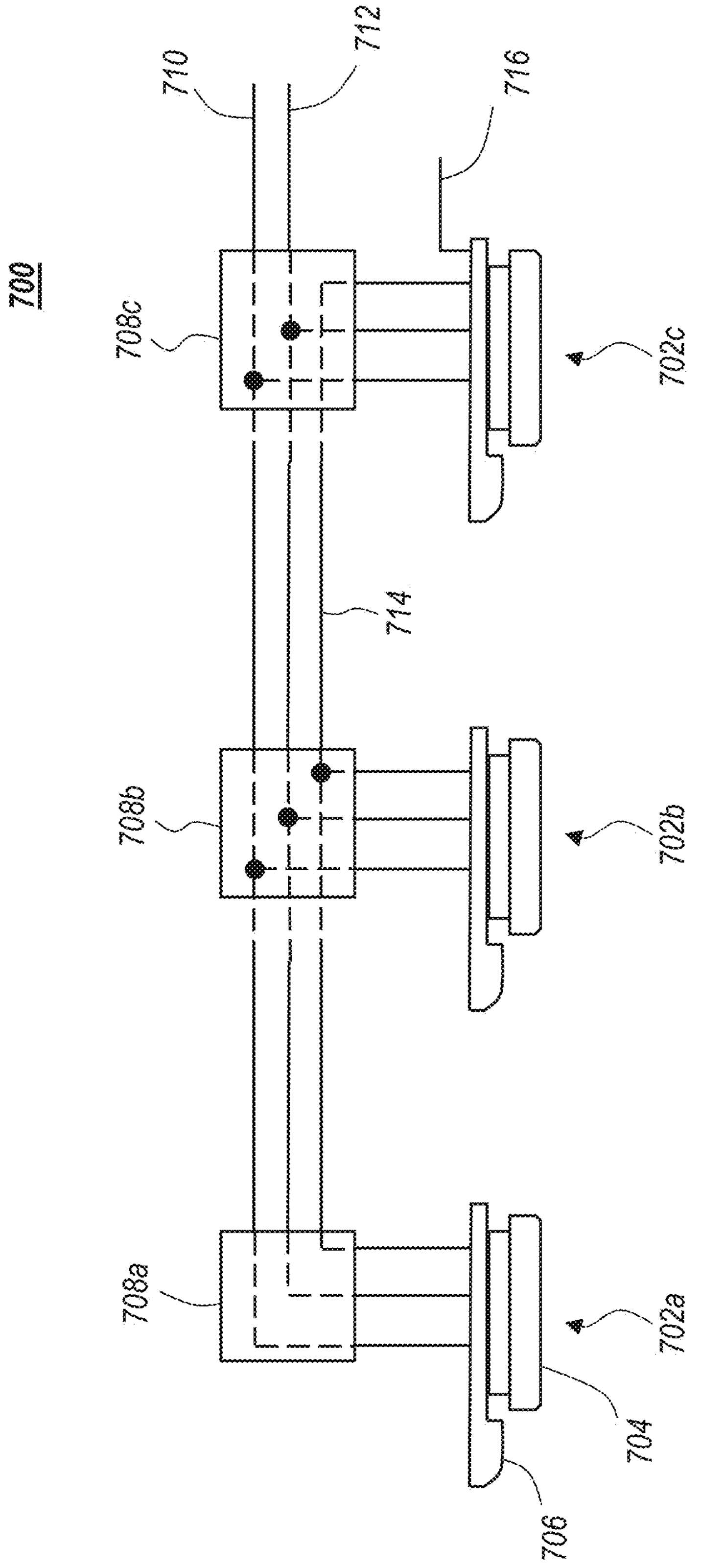
FIG. 7 shows a schematic deployment of multiple sounder and detector unit pairs in residence, in accordance with some embodiments.

FIG. 7 shows a schematic deployment of multiple sounder and detector unit pairs 702*a*, 702*b*, 702*c* in a residence unit 700, in accordance with some embodiments. A residence unit generally has a smoke detector in each bedroom and one in a common area, so there could be more or fewer sounder/detector pairs 702*a*-702*c*. Each of the sounder/detector pairs 702*a*-702*c* include a smoke detector 704 that is mounted on a sounder device 706 as shown in FIG. 5, for example. The sounder/detector pairs 702*a*-702*c* are shown oriented for mounting on a ceiling, but they can likewise be mounted on a wall in a vertical orientation. The ceiling is not shown here, but would be immediately adjacent and just above each of the unit pairs 702*a*-702*c*. On the other side of the ceiling/wall there is a respective junction box 708*a*, 708*b*, and 708*c*. Here the junction boxes 708*a*-708*c* are shown separated from each of respective sounder/detector unit pairs 702*a*-702*c* to illustrate the wiring connections, but in actual practice each of the sounder/detector units 702*a*-702*c* would be mechanically coupled to their respective junction box 708*a*-708*c* through an opening through the ceiling/wall. Each sounder/detector unit 702*a*-702*c* is connected to a line wire 710 and a neutral wire 712 for power. The line and neutral wires 710, 712 are shown common to each junction box 708*a*-708*c*, but they can come from different power circuits (e.g., electrical breakers). An alarm wire 714, however, is common, and connected to each of the sounder/detector units 702*a*-702*c*. Each of the line, neutral, and alarm wires 710, 712, 714 are connected to each detector 704 and each sounder 706 in each of the sounder/detector pairs 702*a*-702*c*. With the alarm wire 714 being common to each of the sounder/detector pairs 702*a*-702*c*, if any of the detectors 704 on the sounder/detector pairs 702*a*-702*c* assert an alarm signal on the alarm wire 714, then each other sounders 706 and smoke detector 704 will detect the alarm signal assertion on the alarm wire 714 and commence emitting an audible alarm. The detectors 704 will emit a sound at a first frequency (e.g., 3250 Hz) and each sounder 706 will emit a sound at a frequency less than that of the detectors (e.g., 520 Hz). If the sounder/detectors 702*a*-702*c* are to be connected to an alarm panel, the relay output 716 is used to connect to the alarm panel. The relay output 716 can be equivalent to 624 of FIG. 6.

Figure 8A:
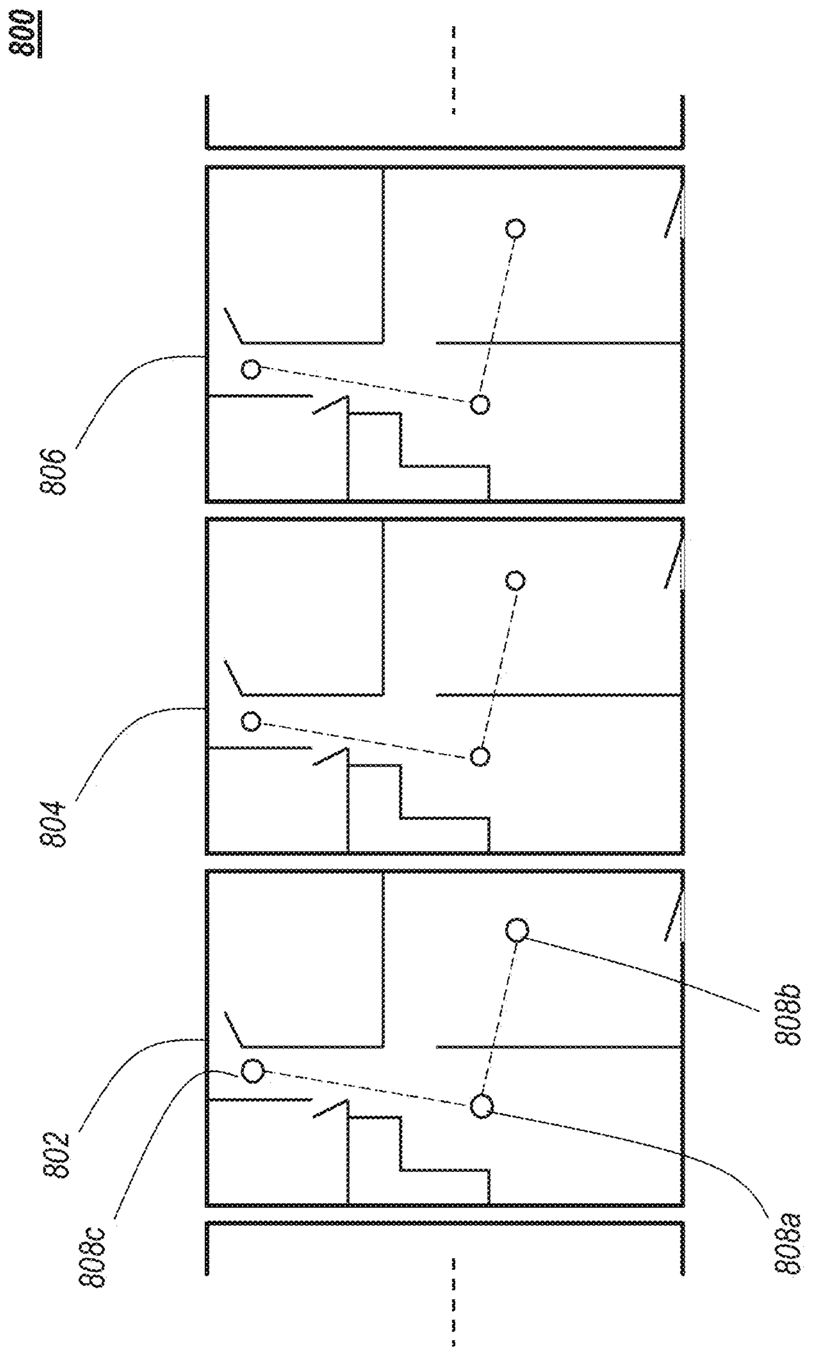
FIG. 8A shows an arrangement 800 of sounder and detector paired units in a multi-unit residential application, in accordance with some embodiments.

FIG. 8A shows an arrangement 800 of sounder and detector paired units in a multi-unit residential application, in accordance with some embodiments. The exemplary arrangement shown here illustrates the "stand alone" arrangement of sounder and detector paired units. The detectors (e.g. 108) have been replaced with sounder and detector paired units as shown in FIG. 5, for example. There are several, or a plurality of residence units 802, 804, 806, among others. Each of these residence units 802, 804, 806 includes a plurality of sounder and detector paired units 808*a*, 808*b*, 808*c* that each operate independently of each other, but which are connected together by a common alarm wire so that if any of the detectors assert an alarm signal then all of the detectors and sounders will likewise commence emitting alarm sounds. The sounder and detector paired units 808*a*, 808*b*, 808*c* of each residence unit are mounted on the ceiling, or on a wall, and are coupled to a junction box to receive electric power. The sounder and detector paired units 808*a*, 808*b*, 808*c* include a sounder that is capable of producing the 520 Hz acoustic audio signal in response to the detector emitting an audible alert at 3250 Hz. There is at least a common alarm link or wire between the sounder and detector units 808*a*, 808*b*, 808*c*, and they could be linked within each residence unit as shown in FIG. 7 without connection to an alarm panel. The sounder (e.g. 706) is capable of generating the necessary acoustic signal at 520 Hz for at least the minimum necessary time if power is lost, per applicable fire codes, by use of the rechargeable battery and the high efficiency audio power amplifier. Thus, the sounder primarily draws power from the battery when power is lost.

Figure 8B:
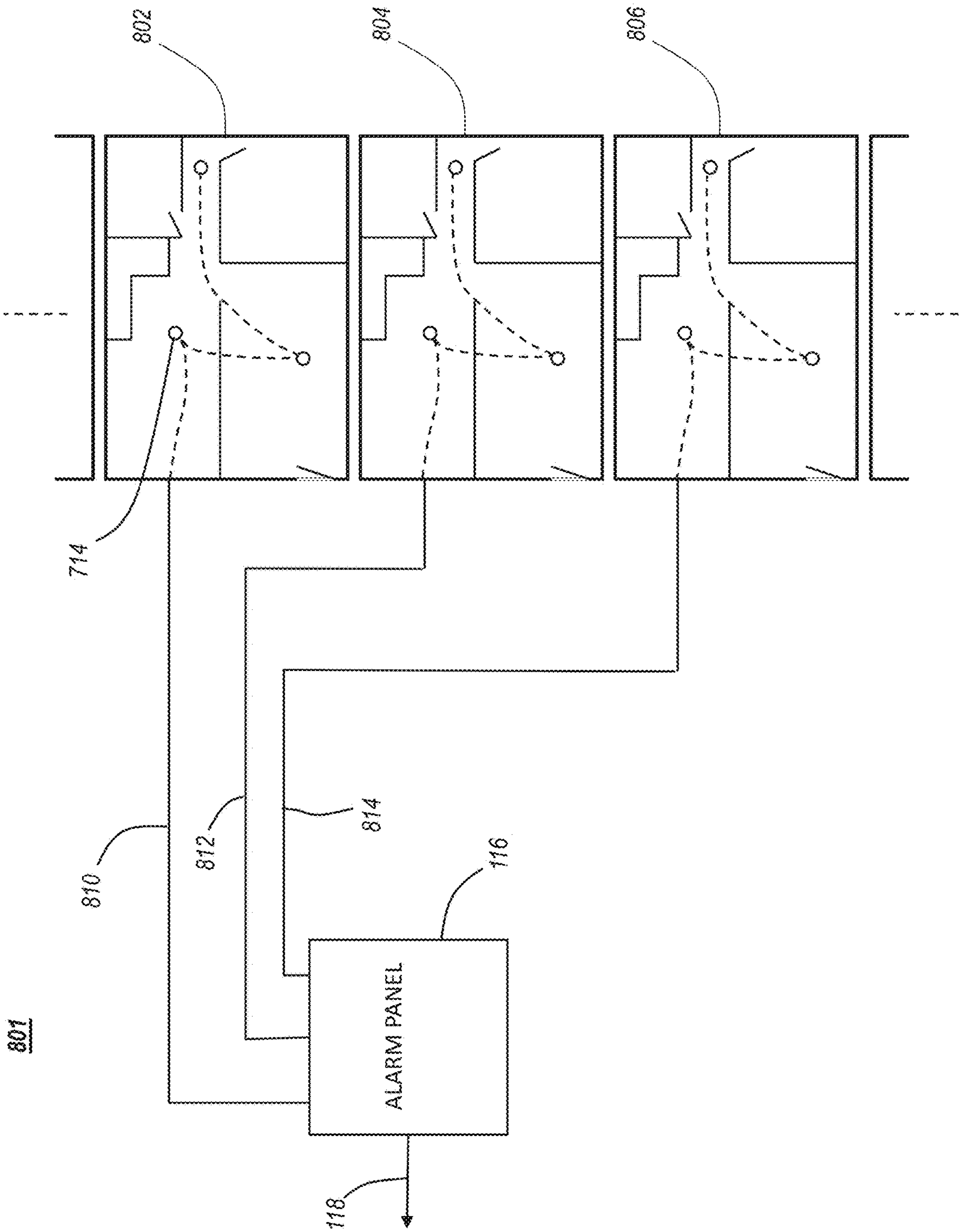
FIG. 8B shows a fire alarm system for a multi-residence building using the inventive sounder and detector unit pairs, in accordance with some embodiments.

FIG. 8B shows a fire alarm system 801 for a multi-residence building using the inventive sounder and detector unit pairs, in accordance with some embodiments. This example is similar to the prior art example shown in FIG. 1, but the detectors 108 have been replaced with sounder and detector paired units, such as 702*a*-702*c* of FIG. 7, and as shown in FIG. 5, for example. There are several, or a plurality of residence units 802, 804, 806, among others. Each of these residence units includes a plurality of sounder and detector paired units 702*a*-702*c* that can be daisy chained, electrically, together throughout the residence unit. The sounder and detector paired units 702*a*-702*c* of each residence unit are connected to the alarm panel 116 by a respective wire group 810, 812, 814. But because the sounder and detector paired units 702*a*-702*c* include a sounder that is capable of producing the 520 Hz acoustic audio signal, separate lines for sounder speakers in each residence unit are not needed. This reduces the amount of wiring that needs to be installed and maintained over the prior art. Accordingly, only the alarm relay lines are needed in wire groups 810, 812, 814, or an equivalent to provide the alarm panel 116 with alarm information. The sounder (e.g. 706) is capable of generating the necessary acoustic signal at 520 Hz. If power is lost the rechargeable battery allows the sounder to emit the alarm sound for at least the minimum necessary time, per applicable fire codes. As can be seen here, each of the sounder and detector pair units 702*a*-702*c* are daisy chained together on the same power and alarm lines within each residence unit. Thus, the inventive sounder eliminates the need to have wiring from the alarm panel to each of the sounder speakers in the residence. By reducing the amount of wiring, the number of connections to the alarm panel 116 can be greatly reduced, which can obviate the need for additional alarm panels, and it reduces the amount of maintenance needed to maintain the alarm system.

Figure 9:
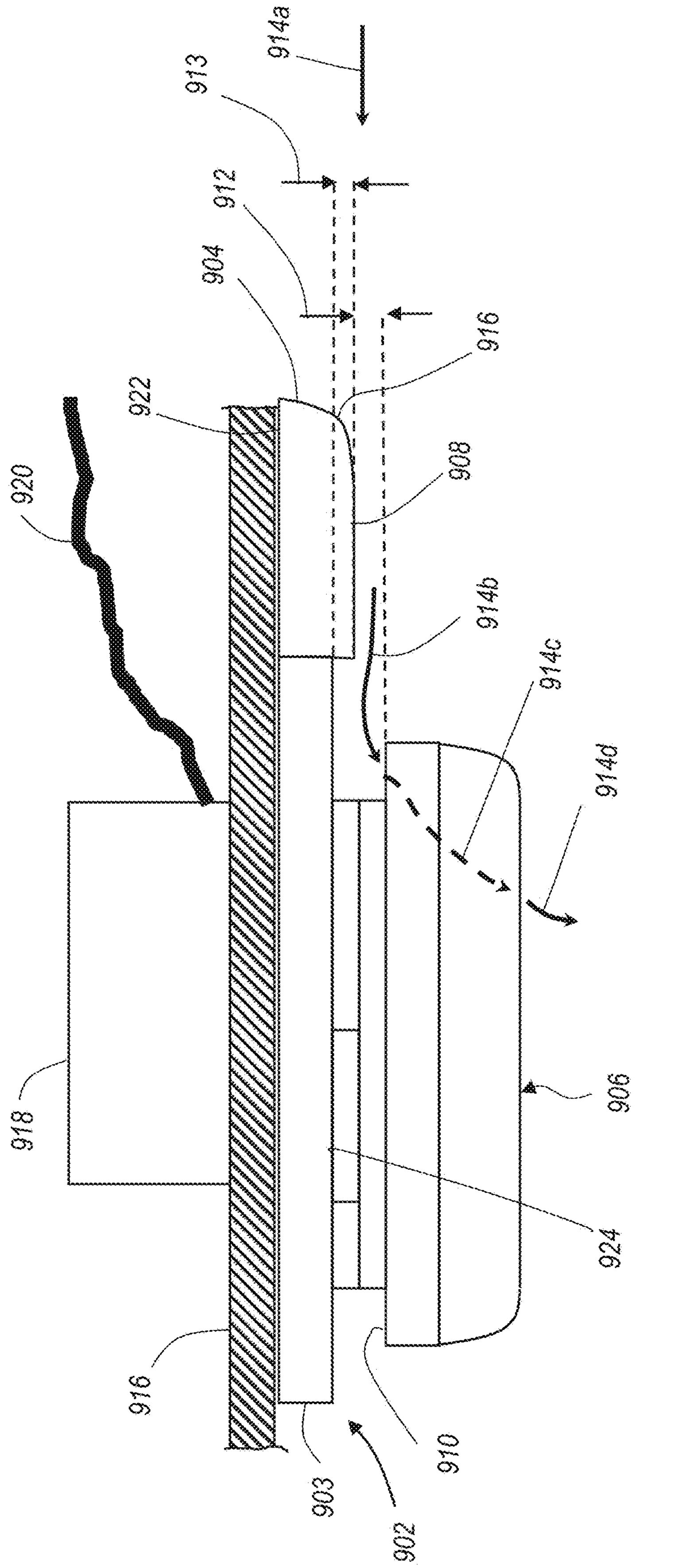
FIG. 9 shows a side elevational view of a sounder and detector unit pair illustrating the height of the lobed housing portion to ensure adequate air flow past the lobed housing portion to the detector, in accordance with some embodiments.

FIG. 9 shows a side elevational view of a sounder and detector unit pair illustrating the height of the lobed housing portion to ensure adequate air flow past the lobed housing portion to the detector, in accordance with some embodiments. The sounder 902 has a detector 906 mounted on the mounting portion 903 of the sounder 902. The detector 906 is able to connect to the power and alarm lines 920 in a junction box 918 in the ceiling or wall 916 (shown here in cut-away) through the sounder 902. To detect smoke, air must move through the detector 906. Typically, air moves through openings around the skirt 910 and through the interior of the detector 906 and a vent (e.g., 420) on the face of the detector 906. The housing portion 904, in which the electronics and battery are disposed, has a surface 908 that is higher up than the skirt 910 by a non-zero distance 912, in a direction from the skirt 910 towards the mounting surface 924. Stated another way, the housing portion 904 extends outward, in a direction perpendicular to the mounting face 922, relative to the mounting surface 924, a distance 913, which is a non-zero distance. The surface 908 is the "top" of the housing portion 904 and can be generally flat. No portion of the housing portion 904 extends further than the distance 913 from the mounting surface 924, and the skirt 910 is further from the mounting surface 924. This ensures that there is a gap (e.g. distance 912) between the housing portion 904 and the skirt 910 that will allow airflow in the direction of arrow 914*a* to enter the detector 906. Given the difference in height 912, the airflow can continue through the detector 906 as indicated by arrows 914*b*, 914*c*, and 914*d*. The housing portion 904 further has a rounded outer edge 916 to further minimize disruption of air flow through the detector 906. Stated another way, the skirt of the detector 906 is farther from the mounting portion 903 than is the top surface 908 of the housing portion 904 of the sounder 902. The housing portion 904 extends further from a mounting face 922 of the sounder than the mounting surface 924 of the mounting portion 903, but not as far as the skirt is from the mounting surface. The mounting face 922 is configured to be against, or substantially against, a surface of a wall 916, and therefore defines a plane. The mounting surface 924 of the mounting face is also generally flat since it is configured to receive a detector 906, or a detector base on which the detector 906 is mounted, which are likewise configured to be mounted on a flat surface such as a wall/ceiling. The mounting face 922 can therefore be parallel to the plane defined by the mounting surface 924 of the mounting portion. The mounting face 922 is at the backside of the sounder device 902, and faces toward the wall 916 while the mounting surface 924 is on the other side of the mounting portion 903 from the mounting face 922 and faces outward. Thus, the distance 912 is measured in a direction that is perpendicular to the surface of the wall 916.

Figure 10:
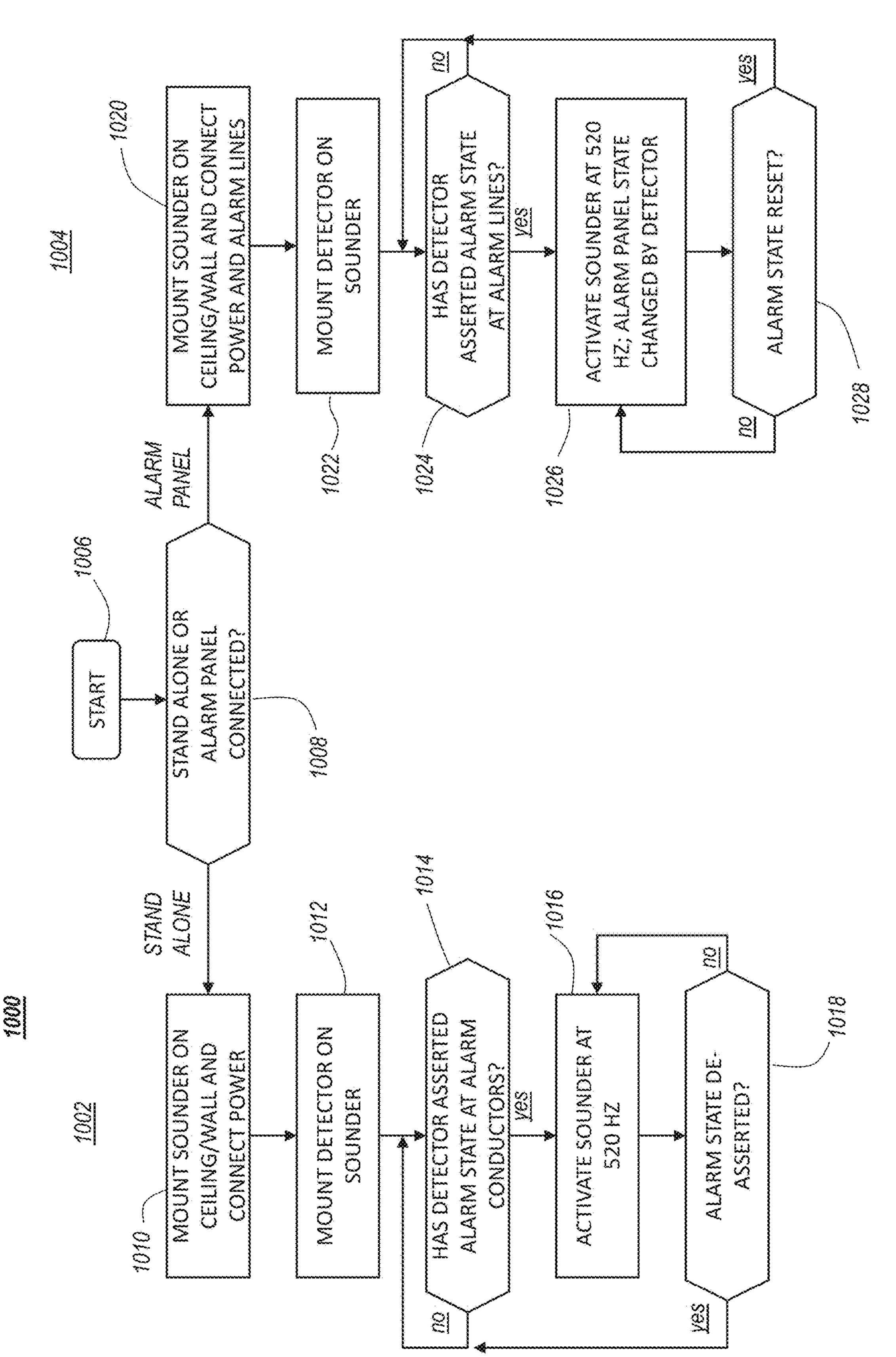
FIG. 10 is a flow chart diagram illustrating different methods of mounting and operating a sounder unit, in accordance with some embodiment.

FIG. 10 is a flow chart diagram 1000 illustrating different methods of mounting and operating a sounder unit, in accordance with some embodiment. In general, there is a stand-alone method 1002 and an alarm panel method 1004. In the stand-alone method 1002 the sounder and detector are not connected to an alarm panel, and in the alarm panel method 1004 the detector and sounder are connected to a building alarm panel. At the start 1006 one or more sounder units are provided which are constructed substantially as described herein. There are also a corresponding number of detector units. In step 1008 a decision is, or has been made for a given sounder to either be stand-alone or connected to an alarm panel.

When the sounder is to be operated in a stand-alone configuration, then method 1002 is followed, and in step 1010 the sounder is mounted on a ceiling or wall and connected to an electrical power source. Typically the sounder will be mounted to cover a hole in the ceiling/wall through which there is access to an electrical junction box. Once the sounder is mounted, then in step 1012 the detector is mounted on the sounder, either directly, or on a detector base that is mounted on the sounder. The detector connects to a connector on the sounder that is connected to the electrical power source so that it will be powered, at which point the detector begins monitoring/sampling in step 1014. While there is no indication of fire/smoke, the monitoring simply continues, expressed here as a short branch loop. However, when the detector does get triggered in step 1014, the method 1002 proceeds to step 1016 where the detector begins to emit the 3250 Hz alert tone, and it asserts an alarm signal on the alarm lines, or at the alarm line contacts of the detector. In response, in step 1016, the sounder will detect the alarm state of the detector, and the sounder will then begin emitting the 520 Hz tone, and continue to do so in step 1018 until the alarm state is de-asserted by the detector, at which time the method 1002 will return to the monitoring step 1014.

In the alarm panel configuration, method 1004 is followed where the sounder is connected to alarm wires and indicated in FIG. 7, which are further connected to the alarm contacts of the detector. In step 1020, as in step 1010, the sounder is mounted on a ceiling or wall over a junction box. But here, in addition to power, there are also alarm signal conductors that are connected to the electrical connector of the sounder. In step 1022 the detector is then mounted on the sounder, and connected, through the connector of the sounder, to the power and alarm conductors/wires. After step 1022 the detector and sounder are operable, and in step 1024 the sounder monitors the alarm lines to determine if the detector has asserted an alarm state. When the detector does assert an alarm state, the method 1004 proceeds to step 1026 where the sounder activates its 520 Hz audio alarm signal. Also, the alarm state is reflected at the alarm panel of the building. The alarm state persists until it is reset in step 1028 and the method 1004 returns to step 1024.

The disclosed sounder is configured to connect to a detector that it hosts and is mounted on the sounder in order to detect when the detector has gone into an alarm state. When the detector goes into an alarm state, it asserts an alarm state signal on a pair of alarm signal terminals, which can be connected to an alarm panel. When the detector has detected smoke or fire, and asserts the alarm signal, the sounder, in response, generates an audio tone at 520 Hz to supplement the 3250 Hz alarm tone generated by the detector, in case an occupant of the structure has difficulty hearing a tone at 3250 Hz. The sounder is designed to provide an especially low mounting profile, housing most of its components in a lobe-like housing section that is to the side of a main mounting section on which the detector is mounted. The housing section itself has a low profile in order to ensure proper airflow through the detector. Further, in applications where the detector is connected to an alarm panel, by sensing the alarm signal state of the detector mounted on the sounder, separate lines from the alarm panel to the sounder are not needed in order to activate the sounder. This can reduce the amount of wiring needed for a structure, as well as reduce the alarm panel size needed for the structure.

The claims appended hereto are meant to cover all modifications and changes within the scope and spirit of the present invention.

What is claimed is:

1. A sounder device for use with a detector, comprising:

a mounting face at a back of the sounder device that is configured to be against a wall when the sounder device is mounted on the wall;

a mounting portion configured to receive the detector, the mounting portion having a mounting surface, and including an electrical connector having power terminals and an alarm terminal;

a housing portion located at a side of the mounting portion and including:

a rechargeable battery;

a speaker; and wherein the housing portion extends outward relative the mounting surface a first distance in a direction perpendicular to the mounting surface, where no portion of the housing portion extends further than the first distance, and the first distance is selected to be less than a distance from the mounting surface to a skirt of a detector mounted on the mounting surface when the detector is mounted on the mounting surface;

a charge control circuit coupled to the power terminals and operable to charge the rechargeable battery;

an amplifier coupled to the speaker and configured to drive the speaker; and a control circuit coupled to the alarm terminals and to the amplifier, the control circuit being configured to detect an alarm state at the alarm terminal and in response cause the amplifier to drive the speaker at frequency below 3250 Hz.

2. The sounder device of claim 1, wherein the electrical connector includes a positive power terminal, and negative power terminal, and an alarm terminal.

3. The sounder device of claim 1, wherein the control circuit is configured to cause the amplifier to drive the speaker at 520 Hz.

4. The sounder device of claim 1, wherein the amplifier is powered by the rechargeable battery if power is lost at the power terminals.

5. A fire detection and alarm system, comprising:

a sounder device including:

a mounting face that is configured to be mounted against a wall;

a mounting portion having a mounting surface opposite the mounting face, and having an electrical connector disposed at the mounting surface having power terminals and alarm terminals;

a housing portion adjacent the mounting portion including a rechargeable battery and a speaker;

an amplifier coupled to, and configured to drive the speaker;

a control circuit coupled to the alarm terminals and configured to detect an alarm state at the alarm terminals and in response cause the amplifier to drive the speaker at an alarm tone that is less than 3250 Hz;

a detector mounted on the mounting portion of the sounder device, the detector having power terminals coupled to the power terminals of the electrical connector disposed at the mounting surface, and having an alarm terminal connected to the alarm terminal of the electrical connector disposed at the mounting surface, wherein the detector is configured to detect an ambient condition indicative of a fire and in response assert an alarm state at the alarm terminal; and wherein the housing portion extends outward relative the mounting surface a first distance in a direction perpendicular to the mounting surface, where no portion of the housing portion extends further than the first distance, and the first distance is selected to be less than a distance from the mounting surface to a skirt of the detector.

6. The fire detection and alarm system of claim 5, wherein the electrical connector includes a line power terminal, a neutral power terminal, and the alarm terminal.

7. The fire detection and alarm system of claim 5, wherein the control circuit is configured to cause the amplifier to drive the speaker at 520 Hz.

8. The fire detection and alarm system of claim 5, wherein the sounder device further comprises an alarm relay.

9. A system for fire detection and alarming for a building having a plurality of residence units, comprising:

in each residence unit of the plurality of residence units, a plurality of sounder and detector paired units, each sounder and detector paired unit comprising:

a sounder unit mounted on a wall having an electrical connector including an alarm line, the sounder unit having a mounting portion having a mounting surface, and having an electrical connector disposed at the mounting surface having power terminals and an alarm terminal, the alarm terminal being connected to the alarm line, the sounder further having a housing portion adjacent the mounting portion;

a detector that is mounted at the mounting surface and electrically connected to the electrical connector, the detector being configured to detect at least one of fire or smoke and generate an alarm signal at the alarm terminal and an audible alarm at a first frequency;

wherein the housing portion of the sounder unit extends outward relative the mounting surface a first distance in a direction perpendicular to the mounting surface, where no portion of the housing portion extends further than the first distance, and the first distance is selected to be less than a distance from the mounting surface to a skirt of the detector;

wherein the sounder unit is configured to detect the alarm signal and in response generate an audible alarm at a second frequency; and wherein an alarm relay of the sounder unit is connected to an alarm panel of the building.

10. The system of claim 9, wherein the first frequency is 3250 Hz and the second frequency is 520 Hz.

11. The system of claim 9, wherein the sounder unit includes a rechargeable battery that is charged via the electrical connector.

12. The system of claim 11, wherein the sounder unit further includes a rechargeable battery and an audio amplifier that are housed in the housing portion of the sounder unit.

13. The system of claim 9, wherein the alarm line of each residence unit of the plurality of residence units is the only alarm line connected between the residence unit and the alarm panel for each residence unit of the plurality of residence units.

* * * * *